United States Patent [19]
Paulus et al.

[11] Patent Number: 5,578,138
[45] Date of Patent: Nov. 26, 1996

[54] COMPOSITIONS COMPRISING 1,1–DICHLORO–1–FLUOROETHANE AND PROCESS FOR THE REMOVAL OF WATER FROM A SOLID SURFACE

[75] Inventors: Mireille Paulus, Bruxelles; Robert Putteman, Lebbeke; Pierre Barthelemy, Pietrebais, all of Belgium

[73] Assignee: Solvay (Société Anonyme), Brussels, Belgium

[21] Appl. No.: 437,978

[22] Filed: May 10, 1995

[30] Foreign Application Priority Data

May 18, 1994 [FR] France .................. 94 06237

[51] Int. Cl.$^6$ .................. B01D 12/00; B01D 17/02; C11D 1/58; C11D 3/24
[52] U.S. Cl. .................. 134/42; 134/34; 252/194; 34/340; 548/335.5; 548/341.1; 106/2
[58] Field of Search .................. 252/170, 171, 252/542, 194, 153; 134/42, 34; 34/340

[56] References Cited

U.S. PATENT DOCUMENTS

| | | | |
|---|---|---|---|
| 3,822,213 | 7/1974 | Johnson | 252/162 |
| 3,852,075 | 12/1974 | Basadur | 106/11 |
| 3,903,012 | 9/1975 | Brandreth | 252/194 |
| 3,954,647 | 5/1976 | Neros et al. | 252/153 |
| 3,998,775 | 12/1976 | Taub | 260/29.6 MN |
| 4,146,499 | 3/1979 | Rosano | 252/186 |
| 4,244,699 | 1/1981 | Smith et al. | 44/1 SR |
| 4,763,423 | 8/1988 | Kemp, Jr. | 34/9 |
| 5,256,329 | 10/1993 | Li et al. | 252/194 |
| 5,399,281 | 3/1995 | Buchwald et al. | 252/153 |

FOREIGN PATENT DOCUMENTS

| | | |
|---|---|---|
| 1-132814 | 5/1989 | Japan . |
| 3186305 | 8/1991 | Japan . |
| 4297427 | 10/1992 | Japan . |
| 05004004 | 1/1993 | Japan . |
| 5-4004 | 1/1993 | Japan . |

OTHER PUBLICATIONS

Sukornick, B., "Potentially Acceptable Substitutes for Chlorofluorocarbons", *Int. J. of Thermophysics*, 10(3)(1989), 553–561.

*Primary Examiner*—Douglas J. McGinty
*Attorney, Agent, or Firm*—Spencer & Frank

[57] ABSTRACT

Compositions based on 1,1-dichloro-1-fluoroethane and a surfactant comprising at least one imidazoline, which are usable for removing water from a solid surface.

14 Claims, No Drawings

COMPOSITIONS COMPRISING 1,1-DICHLORO-1-FLUOROETHANE AND PROCESS FOR THE REMOVAL OF WATER FROM A SOLID SURFACE

FIELD OF THE INVENTION

The present invention relates to compositions based on 1,1-dichloro-1-fluoroethane and to a process for removal of water from a solid surface by means of these compositions.

TECHNOLOGY REVIEW

In the field of the electrical, electronic, optical and mechanical industries, in particular during the production of high precision parts, it can happen that the latter come into contact, intentionally or otherwise, with water or moisture. The water can adhere to the surface of these parts and then cause certain deleterious effects during subsequent steps in which they are involved, or can adversely affect their quality. It is accordingly essential, for many precision parts, for the water adhering to their surface to be removed completely from them. This operation of removal of water from the surface can be carried out, in particular, by displacement of the water by means of a dense, water-immiscible organic liquid optionally containing a surfactant.

Many compositions are known for the removal of water by displacement of the latter, in particular compositions based on 1,1-dichloro-1-fluoroethane. In particular, in Patent Application JP-A-05/004004, compositions are described which are based on 1,1-dichloro-1-fluoroethane to which a surfactant, preferably selected from salts derived jointly from aliphatic monocarboxylic acids comprising 6 to 10 carbon atoms and primary aliphatic monoamines comprising 8 to 12 carbon atoms, is added.

When these known compositions are used to remove water from a solid surface, very small droplets of water are nevertheless often retained at the surface. Furthermore, these compositions sometimes form emulsions with water, making subsequent separation of the composition and displaced water difficult. These compositions become exhausted very quickly. After a few cycles of use of these compositions for the removal of water from the surface of parts, they lose their efficacy completely.

SUMMARY OF THE INVENTION

The subject of the invention is compositions comprising 1,1-dichloro-1-fluoroethane and a surfactant, which display a good capacity for the removal of water from solid surfaces without displaying the abovementioned drawbacks of the known compositions.

DETAILED DESCRIPTION OF THE INVENTION

Accordingly, the invention relates to compositions comprising 1,1-dichloro-1-fluoroethane and a surfactant, characterized in that the surfactant comprises at least one imidazoline.

Imidazoline is understood to denote any organic compound comprising a structure

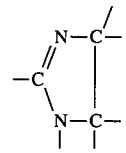

According to a preferred embodiment of the compositions according to the invention, the imidazoline corresponds to the formula

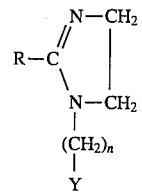

in which R represents an alkyl or alkenyl chain, Y represents a hydroxyl or amino group and n is an integer equal to at least 1. In this preferred embodiment of the compositions according to the invention, the number of carbon atoms in the alkyl or alkenyl chain R does not generally exceed 25, and preferably 20. Imidazolines in which R is an alkyl or alkenyl chain comprising at least 6, and preferably at least 10, carbon atoms are especially preferred. Very special preference is given to imidazolines in which R comprises 11 or 17 carbon atoms. In this preferred embodiment of the compositions according to the invention, the integer n does not generally exceed 20, and preferably 12. Imidazolines in which n is equal to 2 are especially preferred. Imidazolines in which R comprises 11 or 17 carbon atoms and n is equal to 2 are especially advantageous, especially those in which R comprises 17 carbon atoms, n is equal to 2 and Y is an amino group.

The imidazoline used in the compositions according to the invention can be in free base form or in the form of a mono- or dicarboxylate salt. In the case where the imidazoline is in the form of a mono- or dicarboxylate salt, the carboxylate portion is preferably derived from a saturated or unsaturated fatty acid containing 4 to 22 carbon atoms. Good results have been obtained with oleates and laurates. According to an advantageous embodiment of the compositions according to the invention, the imidazoline is in free base form or in the form of a monocarboxylate salt.

Imidazolines which are usable in this embodiment of the compositions according to the invention are well known, and can be synthesized, in particular, by reaction at high temperature of saturated or unsaturated fatty acids corresponding to the formula RCOOH with substituted ethylenediamines of formula $NH_2-CH_2-CH_2-NH-(CH_2)_n-Y$. They are also to be found on the market, in particular under the names SERVAMIN®KOO 360 and SERVAMIN®KOO 330 (sold by the firm SERVO), IMIDAZOLINE 18NH, IMIDAZOLINE 18OH, IMIDAZOLINE 12NH and IMIDAZOLINE 12OH (sold by the firm LAKELAND) and MIRAMINE®HDO (sold by the firm RHONEPOULENC).

In the compositions according to the invention, the imidazoline content is advantageously equal to at least 0.001%, and preferably 0.01%, by weight relative to the weight of 1,1-dichloro-1-fluoroethane. The imidazoline content does not generally exceed 5%, and preferably 1%, by weight relative to the weight of 1,1-dichloro-1-fluoroethane.

Compositions according to the invention can contain, in addition to 1,1-dichloro-1-fluoroethane and the surfactant, other compounds, in particular halogenated hydrocarbons, alcohols such as methanol, ethanol and decanol, or esters such as methyl acetate. In this case, the content of other compounds does not generally exceed 25%, and preferably 10%, by weight relative to the weight of 1,1-dichloro-1-fluoroethane.

The compositions according to the invention can contain, in addition to the compounds described above, additives enabling the performances of the compositions to be improved when they are used, such as stabilizers, de-emulsifying agents and/or antifoams.

In the compositions of the invention, the surfactant can contain, in addition to the imidazoline, one or more other surfactants.

Compositions consisting essentially of 1,1-dichloro-1-fluoroethane and at least one imidazoline are preferred.

The compositions according to the invention are liquid compositions which are especially well suited for displacing water from solid surfaces. They satisfy, in effect, the most severe criteria applicable to compositions used for removing water from solid surfaces, by displacement of this water. Thus, they are especially effective for displacing more than 70%, generally at least 95% and even all of the water present on a solid surface. The displacement of the water is very rapid. In this application, the compositions according to the invention have the advantage that they do not form an emulsion with water but, on the contrary, promote the formation of two superposed phases, one of which (the lower phase) consists essentially of the composition according to the invention in which a little water may possibly be dissolved, and the other (the upper phase) consists essentially of the displaced water. This permits a simple subsequent separation between the displaced water and the composition. The compositions according to the invention have the additional advantage that they lend themselves to a large number of successive uses without the nature and proportion of their constituents undergoing appreciable modification. The surfactant is not, in effect, significantly extracted from the compositions by the water which is displaced and is subsequently separated from them.

The compositions according to the invention are suitable for the drying of a wide variety of different materials. They are suitable, in particular, for the drying of parts or materials made of metal, glass, ceramic, precious stones or plastic.

Accordingly, the invention also relates to a process for the removal of water from a solid surface, which is characterized in that the surface is treated with a composition according to the invention.

The process according to the invention applies equally well to moist surfaces, to surfaces on which droplets of water are present and also to surfaces completely covered with a film of water.

To treat the solid surface with the composition according to the invention, it is possible, for example, to subject it to a spraying, a sprinkling, a coating with the composition or an immersion in a bath of the composition. The optimum amount of composition to be used depends, in particular, on the dimensions of the part treated, the amount of water to be removed and the treatment method employed. It may be readily determined in each particular case by routine work. When the immersion technique is used, the composition may be stirred by any suitable means and the action of the composition may be enhanced, for example by application of ultrasound.

The process according to the invention may be carried out at any temperature between the solidification point of water and the boiling point of the composition. The treatment time is not critical. For practical reasons, it is generally advised to place the surface to be treated in contact with the composition for a period of approximately one minute, although shorter or longer treatment times may be used, depending on the characteristics of the surface to be treated. In general, the treatment time is at least 5 seconds, usually at least 30 seconds. In principle, there is no upper limit to the treatment period. Usually, however, the treatment time does not exceed 10 minutes. More often than not, it does not exceed 5 minutes.

According to a preferred embodiment of the process according to the invention, the solid surface is treated by immersion in a bath of the composition. In this case, as a special preference, the bath is at the boiling point.

At the end of the treatment with the composition, the solid surface is, usually, rinsed by means of a non-aqueous solvent, employed in liquid or gaseous form. 1,1-Dichloro-1-fluoroethane may be used for this purpose.

EXAMPLES

The non-limiting examples which follow are given by way of illustration.

Example 1R (comparative)

A piece of polyvinylidene fluoride (PVDF) parallelepipedal (30×20×10 mm) in shape and pierced with holes 1 mm in diameter was immersed in water so as to fill the holes therein. The piece was then dipped into a bath consisting of 1,1-dichloro-1-fluoroethane at the boiling point. After 15, 30, 45 and 60 seconds of immersion, the piece was removed from the bath and the number of water-free holes was determined by visual inspection. The results of these observations are collated in Table I, where the proportion of water-free holes is expressed as a percentage of the total number of holes.

In this Example, 1,1-dichloro-1-fluoroethane used alone proved ineffective for removing the water; even after one minute of immersion, only a small portion of the holes may be considered to be water-free.

Example 2R (comparative)

The procedure of Example 1R was repeated with a bath consisting of 99.8% by weight of 1,1-dichloro- 1-fluoroethane, 0.124% by weight of nonanoic acid and 0.076% by weight of nonylamine. The percentages of water-free holes are given in Table I.

This bath, not according to the invention, proved ineffective for removing the water; even after one minute of immersion, only a small portion of the holes may be considered to be water-free.

Example 3 (according to the invention)

The procedure of Example 1R was repeated with a bath according to the invention, consisting of 99.8% by weight of 1,1-dichloro-1-fluoroethane and 0.2% by weight of a mixture of imidazolines of general formula 1-(2-hydroxyethyl)-2-($C_{11}H_{19-23}$)-2-imidazoline (sold by the firm LAKELAND under the name IMIDAZOLINE 12OH). The percentages of water-free holes are given in Table I.

After one minute of immersion, all the holes may be considered to be water-free.

Example 4 (according to the invention)

The procedure of Example 1R was repeated with a bath according to the invention, consisting of 99.8% by weight of 1,1-dichloro-1-fluoroethane and 0.2% by weight of a mixture of imidazolines of general formula 1-(2-aminoethyl)-2-($C_{11}H_{19-23}$)-2-imidazoline (sold by the firm LAKELAND under the name IMIDAZOLINE 12NH). The percentages of water-free holes are given in Table I.

After one minute of immersion, 72% of the holes may be considered to be water-free.

Example 5 (according to the invention)

The procedure of Example 1R was repeated with a bath according to the invention, consisting of 99.8% by weight of 1,1-dichloro-1-fluoroethane and 0.2% by weight of a mixture of imidazolines of general formula 1-(2-aminoethyl)-2-($C_{17}H_{31-35}$)-2-imidazoline (sold by the firm SERVO under the name SERVAMIN®KOO 330). The percentages of water-free holes are given in Table I.

After one minute of immersion, all the holes may be considered to be water-free.

Example 6 (according to the invention)

The procedure of Example 1R was repeated with a bath according to the invention, consisting of 99.8% by weight of 1,1-dichloro-1-fluoroethane and 0.2% by weight of a mixture of imidazolines of general formula 1-(2-hydroxyethyl)-2-($C_{17}H_{31-35}$)-2-imidazoline (sold by the firm SERVO under the name SERVAMIN®KOO 360). The percentages of water-free holes are given in Table I.

After one minute of immersion, 98% of the holes may be considered to be water-free.

TABLE I

| Example | % of holes water-free after | | | |
|---|---|---|---|---|
| | 15 s | 30 s | 45 s | 60 s |
| Example 1R | 3 | 4 | 4 | 4 |
| Example 2R | 4 | 4 | 6 | 6 |
| Example 3 | 82 | 96 | 97 | 100 |
| Example 4 | 43 | 50 | 62 | 72 |
| Example 5 | 48 | 87 | 98 | 100 |
| Example 6 | 37 | 73 | 89 | 98 |

Example 7 (according to the invention)

The procedure of Example 1R was repeated with a bath according to the invention, consisting of 96% by weight of 1,1-dichloro-1-fluoroethane, 3.8% by weight of methanol and 0.2% by weight of a mixture of imidazolines of the general formula 1-(2-hydroxyethyl)-2-($C_{11}H_{19-23}$)-2-imidazoline (sold by the firm LAKELAND under the name IMIDAZOLINE 12OH). The percentages of water-free holes are given in Table II.

After one minute of immersion, 99% of the holes may be considered to be water-free.

Example 8 (according to the invention)

The procedure of Example 1R was repeated with a bath according to the invention, consisting of 98% by weight of 1,1-dichloro-1-fluoroethane, 1.8% by weight of ethanol and 0.2% by weight of a mixture of imidazolines of general formula 1-(2-hydroxyethyl)-2-($C_{11}H_{19-23}$)-2-imidazoline (sold by the firm LAKELAND under the name IMIDAZOLINE 12OH). The percentages of water-free holes are given in Table II.

After one minute of immersion, 96% of the holes may be considered to be water-free.

Example 9 (according to the invention)

The procedure of Example 1R was repeated with a bath according to the invention, consisting of 94% by weight of 1,1-dichloro-1-fluoroethane, 3.7% by weight of methanol, 2.1% by weight of methyl acetate and 0.2% by weight of a mixture of imidazolines of general formula 1-(2-hydroxyethyl)-2-($C_{11}H_{19-23}$)-2-imidazoline (sold by the firm LAKELAND under the name IMIDAZOLINE 12OH). The percentages of water-free holes are given in Table II.

After one minute of immersion, 86% of the holes may be considered to be water-free.

TABLE II

| Example | % of holes water-free after | | | |
|---|---|---|---|---|
| | 15 s | 30 s | 45 s | 60 s |
| Example 7 | 64 | 87 | 96 | 99 |
| Example 8 | 53 | 83 | 91 | 96 |
| Example 9 | 44 | 69 | 79 | 86 |

Example 10 (according to the invention)

The procedure of Example 1R was repeated with a bath according to the invention, consisting of 99.8% by weight of 1,1-dichloro-1-fluoroethane and 0.2% by weight of the salt of general formula 1-(2-hydroxyethyl)-2-($C_{17}H_{31-35}$)-2-imidazoline oleate (sold by the firm RHONE POULENC under the name MIRAMINE®HDO). The percentages of water-free holes are given in Table III.

After 45 s of immersion, all the holes may be considered to be water-free.

Example 11 (according to the invention)

The procedure of Example 1R was repeated with a bath according to the invention, consisting of 96% by weight of 1,1-dichloro-1-fluoroethane, 3.8% by weight of methanol and 0.2% by weight of the salt of general formula 1-(2-hydroxyethyl)-2-($C_{17}H_{31-35}$)-2-imidazoline oleate (sold by the firm RHONE POULENC under the name MIRAMINE®HDO). The percentages of water-free holes are given in Table III.

After 30 s of immersion, all the holes may be considered to be water-free.

TABLE III

| Example | % of holes water-free after | | | |
|---|---|---|---|---|
| | 15 s | 30 s | 45 s | 60 s |
| Example 10 | 89 | 99 | 100 | |
| Example 11 | 97 | 100 | | |

Example 12R (comparative)

A metal-coated plastic tube of shiny and smooth appearance was immersed in water so as to cover it with a film of water. The tube was then dipped into a bath consisting of 99.8% by weight of 1,1-dichloro-1-fluoroethane, 0.124% by weight of nonanoic acid and 0.076% by weight of nonylamine, at the boiling point. After 60 seconds of immersion, the tube was removed from the bath and subjected to rinsing by means of pure 1,1-dichloro-1-fluoroethane (comprising two immersions in a liquid bath at the boiling point, followed by a treatment in the vapour phase). It was determined by visual inspection whether droplets of water were present on its surface.

This procedure (immersion in water, dipping into the bath, rinsing by means of pure 1,1-dichloro-1-fluoroethane) was repeated using the same bath until the point where the latter lost its activity (which was detected by the presence of droplets of water on the surface of the tube).

After barely 5 cycles (immersion in water, dipping into the bath, rinsing), droplets of water remained present on the surface of the tube.

Example 13 (according to the invention)

The procedure of Example 12R was repeated with a bath according to the invention, consisting of 99.8% by weight of 1,1-dichloro-1-fluoroethane and 0.2% by weight of a mixture of imidazolines of general formula 1-(2-aminoethyl)-2-($C_{17}H_{31-35}$)-2-imidazoline (sold by the firm SERVO under the name SERVAMIN®KOO 330).

After 25 cycles (immersion in water, dipping into the bath according to the invention, rinsing), the surface of the tube proved to be water-free.

The results of the observations made in Examples 12R and 13 show that the compositions according to the invention have the advantage that they lend themselves to a large number of successive uses without losing their efficacy.

What is claimed is:

1. A composition comprising 1,1-dichloro-1-fluoroethane and at least 0.001% by weight relative to said 1,1-dichloro-1-fluoroethane of an imidazoline of the formula

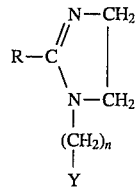

in which R represents an alkyl or alkenyl chain comprising 6 to 25 carbon atoms, Y represents a hydroxyl or amino group and n is an integer from 1 to 20, adapted to avoid formation of stable water-in-oil emulsions.

2. The composition according to claim 1, wherein R is an alkyl or alkenyl chain comprising 10 to 20 carbon atoms.

3. The composition according to claim 2, wherein R comprises 11 or 17 carbon atoms and n is equal to 2.

4. The composition according to claim 3, wherein R comprises 17 carbon atoms and Y represents an amino group.

5. The compositions according to claim 1, wherein the imidazoline is in free base form or in the form of a monocarboxylate salt.

6. The compositions according to claim 1, including 0.01 to 1% by weight of the imidazoline relative to the weight of 1,1-dichloro-1-fluoroethane.

7. The compositions according to claim 1, including at least one additional compound, different from 1,1-dichloro-1-fluoroethane and the imidazoline, selected from alcohols selected from the group consisting of methanol, ethanol, decanol, and mixtures thereof, alkyl acetates and halogenated hydrocarbons, in an amount equal to not more than 25% by weight relative to the weight of 1,1-dichloro-1-fluoroethane.

8. The compositions according to claim 1, consisting essentially of 1,1-dichloro-1-fluoroethane and imidazoline.

9. In a process for removing a water from a solid surface, the improvement comprising treating the surface with a composition according to claim 1, without forming an aqueous emulsion.

10. The composition according to claim 1, wherein n is 1 or 2.

11. The composition according to claim 1, wherein said imidazoline does not exceed 5% by weight relative to said 1,1-dichloro-1-fluoroethane.

12. A method of removing water from a solid surface, without forming an aqueous emulsion, comprising:

applying a composition according to claim 1 to water on a solid surface; and forming two superposed phases, including a lower phase consisting essentially of the composition according to claim 1, and an upper phase consisting essentially of displaced water, without forming an aqueous emulsion.

13. The method according to claim 12, including separating said displaced water from said composition according to claim 2.

14. The method according to claim 13, including applying the separated composition to additional water on a solid surface; and forming two superposed phases, including a lower phase consisting essentially of the composition, and an upper phase consisting essentially of displaced water, without forming an aqueous emulsion.

* * * * *